Figure 1:
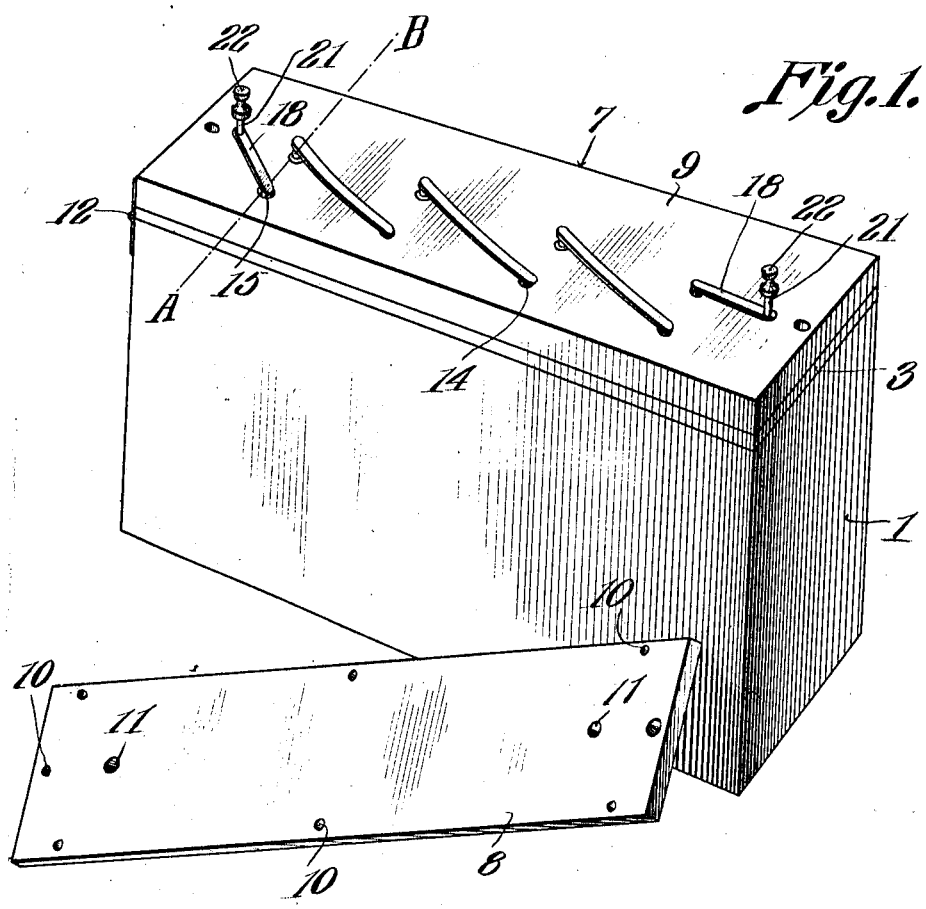

W. HENRICHS.
BATTERY BOX.
APPLICATION FILED NOV. 8, 1910.

988,337.

Patented Apr. 4, 1911

2 SHEETS—SHEET 1.

Witnesses

William Henrichs,
Inventor by C.A. Snow & Co.
Attorneys

W. HENRICHS.
BATTERY BOX.
APPLICATION FILED NOV. 8, 1910.
988,337.
Patented Apr. 4, 1911.
2 SHEETS—SHEET 2.
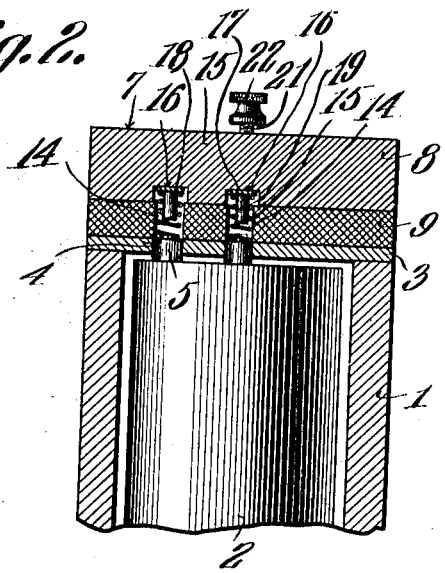
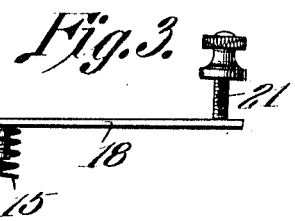
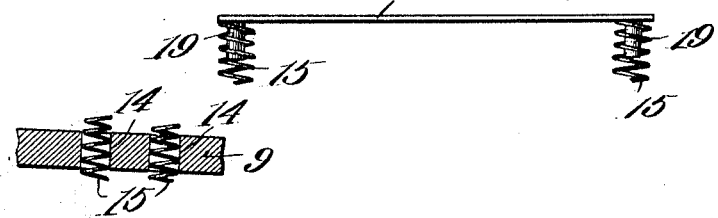
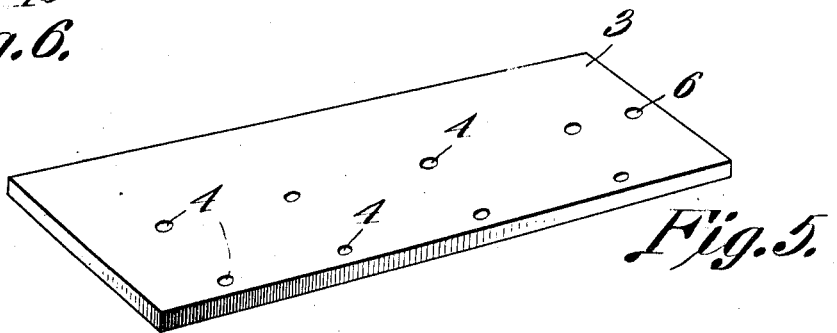
Witnesses
William Henrichs,
Inventor
by
Attorneys

UNITED STATES PATENT OFFICE.

WILLIAM HENRICHS, OF MORO, OREGON.

BATTERY-BOX.

988,337.  Specification of Letters Patent.  Patented Apr. 4, 1911.

Application filed November 8, 1910. Serial No. 591,378.

*To all whom it may concern:*

Be it known that I, WILLIAM HENRICHS, a citizen of the United States, residing at Moro, in the county of Sherman and State of Oregon, have invented a new and useful Battery-Box, of which the following is a specification.

It is the object of this invention to provide a battery box so constructed that when the lid thereof is placed in closed position, all of the cells of battery which are within the box, will be connected, so that all of the cells will be rendered operative.

Another object of the invention is to provide novel means whereby the cells of battery may be connected by the closing of the lid, and to provide novel means whereby the cells of battery may be positioned so as to coöperate with the aforementioned connecting means.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in perspective, a portion of the lid being removed; Fig. 2 is a transverse section upon the line A—B of Fig. 1; Fig. 3 is a side elevation of one of the connecting bars; Fig. 4 is a side elevation of another of the connecting bars; Fig. 5 is a detail perspective of the gage plate; and Fig. 6 is a transverse section of the lower part of the lid, showing the pole-engaging springs mounted therein.

In carrying out the invention there is provided as a primary and fundamental element, a receptacle 1, ordinarily taking the form of a rectangular box. It is within this receptacle 1 that the cells 2 are disposed. The invention further includes a gage plate, denoted by the numeral 3, this gage plate 3 being adapted to rest upon the receptacle 1, and being of the same general configuration as the receptacle. In this gage plate 3 there are a plurality of openings 4, adapted to receive the poles 5 of the battery cells 2. This gage plate 3 is further provided, at any suitable point, with one or more screw holes 6, whereby the gage plate 3 may be connected with the receptacle 1.

The invention further includes a lid 7. This lid 7 is a composite structure, comprising an upper part 8, and a lower part 9. Referring particularly to Fig. 1, wherein the upper part 8 of the lid 7 is clearly shown, it will be seen that this upper part of the lid is provided with a plurality of screw-holes 10 whereby the upper part 8 may be connected to the lower part 9. In the upper part 8 of the lid, moreover, and adjacent the ends thereof, there are openings 11 adapted to receive binding posts as will be described hereinafter. The lid, comprising the parts 8 and 9 is hinged, as shown at 12, to the receptacle 1.

In the lower part 9 of the lid 7 there are a plurality of openings 14, alined with the openings 4 in the gage plate 3. In these openings 14, helical springs 15 are frictionally retained, the springs 15 normally upstanding above, and depending below the part 9 of the lid, as clearly seen in Fig. 6. If desired, the lower face of the upper part 8 of the lid may be channeled, as denoted by the numeral 16. These channels 16 are adapted to receive connecting bars 17 and 18, the forms of which are shown most clearly in Figs. 3 and 4. The connecting bars 17 are provided adjacent their ends with depending lugs 19. These lugs 19 are adapted to register in the upper ends of the helical springs 15, the springs 15 bearing terminally against the bars 17. It will be understood that these bars 17 are adapted to connect the positive pole of one cell of battery with the negative pole of another set, as clearly shown in Fig. 1. The end bars 18 are provided with depending lugs 20, adapted to engage the spring 15 which is connected to the positive pole of the cell of battery which is in one end of the box, and with the spring 15 which is connected with the negative pole of that cell of battery which is disposed in the opposite end of the box. These connecting bars 18, in reality, as will be readily understood from an inspection of Fig. 1, form the terminals of the entire series of cells which are connected by means of the intermediate connecting bars 17. The bars 18 are provided at their extremities with upstanding binding posts 21 and these binding posts 21 protrude through the openings 11 in the upper part 8 of the lid 7, the binding posts 21 carrying binding nuts 22, or any other common means adapted to unite the ends of a circuit with the binding posts 21.

The operation of the device is as follows. The cells 2 of battery are disposed within the receptacle 1, and the gage plate 3 is then mounted in place upon the receptacle 1, the poles 5 of the cells 2 registering in the openings 4 in the gage plate 3. The gage plate 3 is then secured in place upon the receptacle, and all of the poles of the cells will, through the instrumentality of the gage plate 3, be so positioned, that when the lid 7 is swung downwardly into closed position, the springs 15 will bear against the poles 5. When the lid 7 is swung into closed position, the springs 15 will engage yieldingly with the poles 5 of the cells 2, the connecting bars 17 and 18 serving to unite all of the cells, so that when the terminals of the circuit are connected with the binding posts 21, the entire battery of cells will be effective. By reason of the fact that the bars 17 are provided with depending lugs 19, the bars will be held in place, upon the springs 15, an intimate contact being secured.

It will be seen that by simply swinging the lid 7 into a closed position, all of the cells of battery will, in a single operation, be connected up for use.

Having thus described the invention, what is claimed is:—

1. A holder for battery cells, comprising a receptacle; a gage plate adapted to be secured to the receptacle and having openings to receive the poles of the cells; a lid for the receptacle, adapted to be superposed upon the gage plate, and having openings alined with the openings of the gage plate; helical springs located in the openings of the lid, and adapted to engage the poles of the cells; and bars having lugs to register in the ends of the springs to connect the cells.

2. A holder for battery cells, comprising a receptacle; a lid for the receptacle comprising rigidly connected upper and lower parts, the lower part having openings alining with the poles of the cells; pole-engaging springs in the openings; and bars between the parts of the lid and uniting the springs to connect the cells.

3. A holder for battery cells, comprising a receptacle; a gage plate adapted to be secured to the receptacle and having openings to receive the poles of the cells; a lid for the receptacle, adapted to rest upon the gage plate and comprising rigidly connected upper and lower parts, the lower part having openings alined with those of the gage plate; pole-engaging springs in the openings of the lower part of the lid; and bars disposed between the parts of the lid, the bars having lugs registering in the openings in the lower part of the lid and engaging the springs to connect the cells.

In testimony that I claim the foregoing as my own, I have hereto affixed my signature in the presence of two witnesses.

WILLIAM HENRICHS.

Witnesses:
H. S. McDANEL,
H. R. MOORE.